(12) United States Patent
Bhakri

(10) Patent No.: US 10,747,632 B2
(45) Date of Patent: Aug. 18, 2020

(54) DATA REDUNDANCY AND ALLOCATION SYSTEM

(71) Applicant: T-Mobile USA, Inc., Bellevue, WA (US)

(72) Inventor: Nitin Bhakri, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/675,374

(22) Filed: Aug. 11, 2017

(65) Prior Publication Data

US 2019/0050306 A1    Feb. 14, 2019

(51) Int. Cl.
| | | |
|---|---|---|
| G06F 11/00 | (2006.01) | |
| G06F 11/20 | (2006.01) | |
| G06F 11/14 | (2006.01) | |
| H04L 29/08 | (2006.01) | |
| H04L 9/08 | (2006.01) | |

(52) U.S. Cl.
CPC ...... *G06F 11/2094* (2013.01); *G06F 11/1423* (2013.01); *H04L 9/0819* (2013.01); *H04L 67/06* (2013.01); *H04L 67/1008* (2013.01); *H04L 67/1097* (2013.01); *H04L 67/2814* (2013.01); *G06F 11/1428* (2013.01)

(58) Field of Classification Search
CPC .............. G06F 11/142; G06F 11/1423; G06F 11/1425; G06F 11/16; G06F 11/20; G06F 11/2021; G06F 11/2005; G06F 11/2007; G06F 11/2023; G06F 11/2092

USPC ......................................... 714/4.11, 4.1, 2, 3
See application file for complete search history.

(56) References Cited

U.S. PATENT DOCUMENTS

| | | | | |
|---|---|---|---|---|
| 8,792,331 B2 * | 7/2014 | Schwan | ................ | H04L 67/104 370/216 |
| 2003/0217119 A1 * | 11/2003 | Raman | ................ | H04L 67/1095 709/219 |
| 2010/0306595 A1 * | 12/2010 | Murata | ............... | G06F 11/3688 714/39 |
| 2013/0007504 A1 * | 1/2013 | Bodke | ................. | G06F 11/1423 714/4.2 |
| 2013/0262937 A1 * | 10/2013 | Sridharan | ........... | G06F 11/0709 714/47.2 |
| 2014/0122671 A1 * | 5/2014 | Bozga | ................. | H04L 61/2007 709/220 |

(Continued)

*Primary Examiner* — Sarai E Butler
(74) *Attorney, Agent, or Firm* — Han Santos, PLLC

(57) ABSTRACT

This disclosure describes techniques for monitoring network node traffic and dynamically re-directing network node traffic from an active repository that has a non-operational data cluster, to a standby repository with an operational alternate data cluster. Particularly, a "Data Redundancy Allocation" (DRA) system is described that can monitor the operational integrity of an active repository and dynamically co-ordinate and re-direct network node traffic to a standby, redundant data repository in response to detecting that the active repository is no longer operational. In doing so, the data redundancy allocation system may ensure a continuous communication stream of data traffic from network nodes to data repositories (i.e., active repository or a designated standby repository) in spite of a data repository inadvertently becoming non-operational, or intentionally brought offline for a planned upgrade.

20 Claims, 8 Drawing Sheets

(56) References Cited

U.S. PATENT DOCUMENTS

| | | | |
|---|---|---|---|
| 2015/0095384 A1* | 4/2015 | Antony | G06F 16/183 |
| | | | 707/827 |
| 2015/0256409 A1* | 9/2015 | Masuyama | H04L 41/12 |
| | | | 370/254 |
| 2015/0301912 A1* | 10/2015 | Rubin | H04B 17/382 |
| | | | 714/4.11 |
| 2016/0239350 A1* | 8/2016 | Kamawat | G06F 11/2035 |
| 2017/0026369 A1* | 1/2017 | Hao | H04L 63/0876 |
| 2017/0187640 A1* | 6/2017 | Vasudevan | H04L 47/50 |
| 2017/0235609 A1* | 8/2017 | Wires | G06F 9/5016 |
| | | | 718/104 |
| 2018/0096068 A1* | 4/2018 | Venkataramanappa | |
| | | | G06F 16/2379 |
| 2018/0136985 A1* | 5/2018 | Sainath | G06F 9/5094 |
| 2018/0241802 A1* | 8/2018 | Bernat | H04L 67/101 |

* cited by examiner

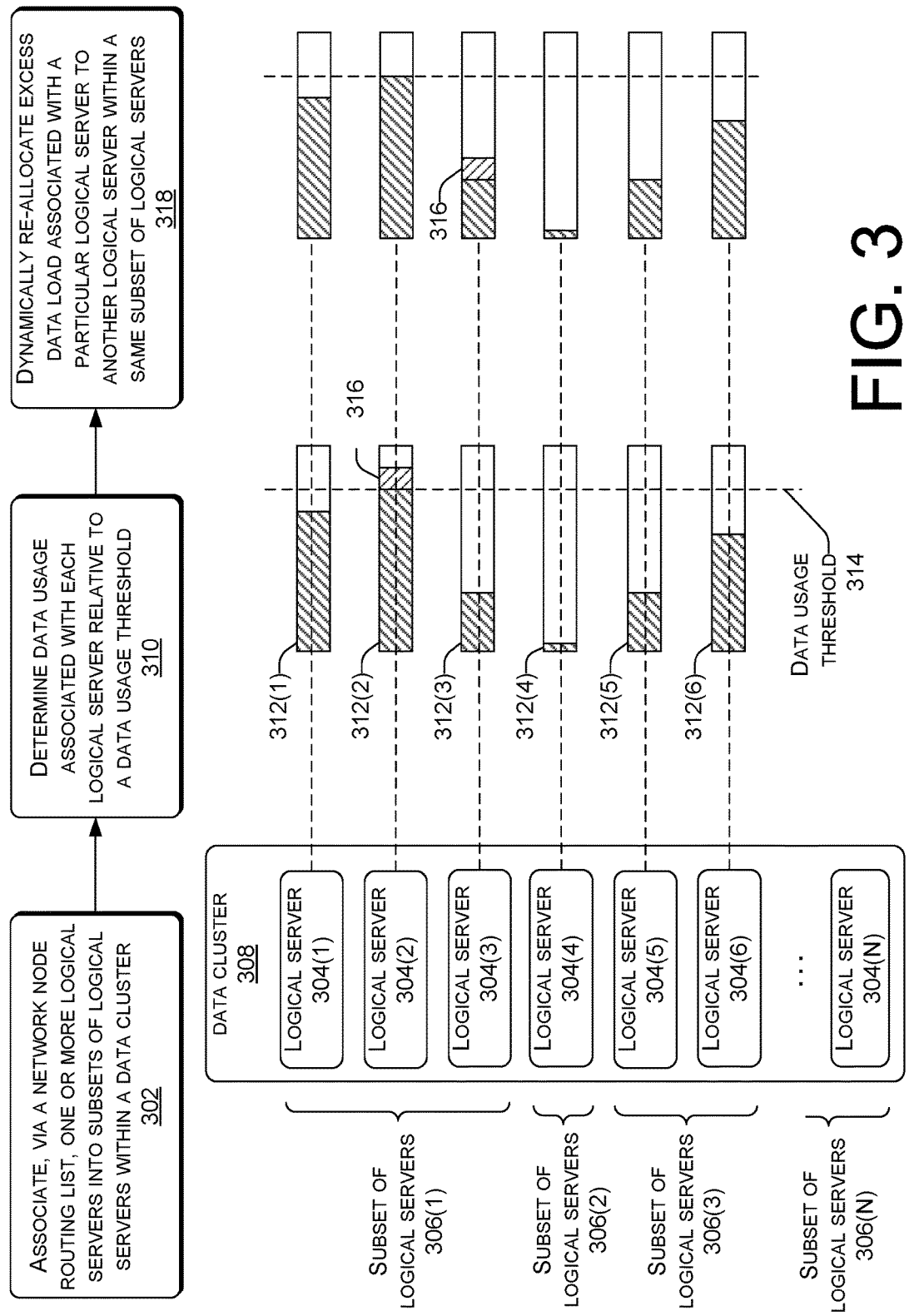

DATA REDUNDANCY AND ALLOCATION SYSTEM

BACKGROUND

In a telecommunications service environment, a telecommunications service provider may receive significant volumes of voice and data communications from client devices operating on the telecommunications network. Each instance of a voice and data communication is logged within a data record for use by the telecommunications service provider in various activities, such as billing and client account management. To accommodate such volume of voice and data communications, as well as the ensuing data records, telecommunications service providers establish multiple data repositories for storage and processing of data records.

Additionally, telecommunications service provider can maintain an integrity of data records by creating redundant repositories that are intended to ensure that storage, processing, and management of data records is not impeded in the event that an active repository inadvertently becomes non-operational, or is brought offline for scheduled maintenance. However, switching between an active repository to a standby repository is a manual task that requires significant coordination, which can impact the integrity of data records transmitting during a transitioning process.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates a block diagram of a Data Redundancy Allocation (DRA) system the facilitates determining a data usage of a logical server and dynamically re-allocating data records associated with network nodes to relieve an overloaded logical server.

DETAILED DESCRIPTION

Figure 1:
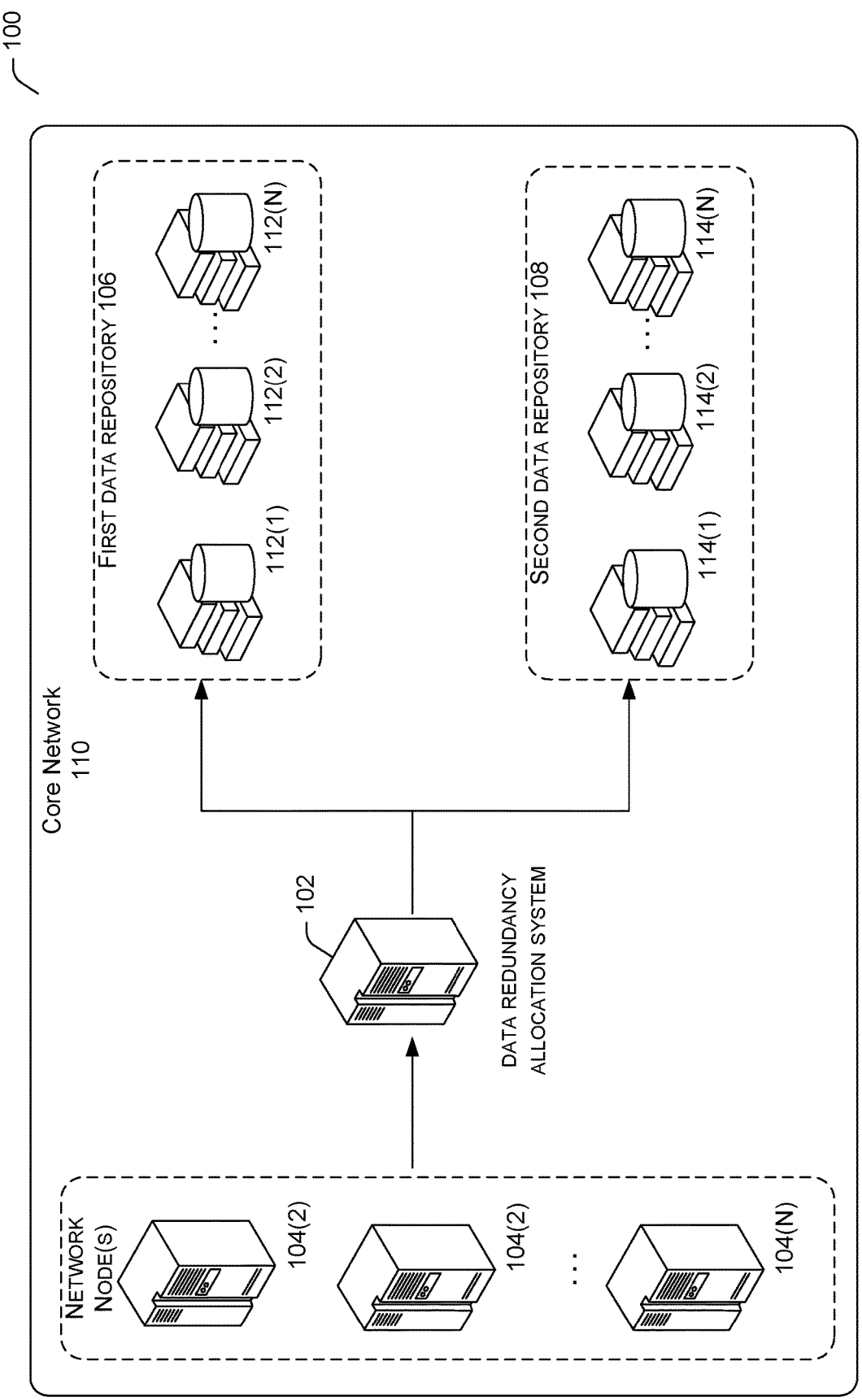
FIG. 1 illustrates a schematic view of a computing environment that facilitates a Data Redundancy Allocation (DRA) system.

This disclosure describes techniques for monitoring network node traffic and dynamically re-directing network node traffic from an active repository that has a non-operational data cluster, to a standby repository with an operational alternate data cluster. Particularly, a "Data Redundancy Allocation" (DRA) system is described that can monitor the operational integrity of an active repository and dynamically co-ordinate and re-direct network node traffic to a standby, redundant data repository in response to detecting that the active repository is no longer operational. In doing so, the data redundancy allocation system may ensure a continuous communication stream of data traffic from network nodes to data repositories (i.e., active repository or a designated standby repository) in spite of a data repository inadvertently becoming non-operational, or intentionally brought offline for a planned upgrade.

Particularly, the data redundancy allocation system may interface between network nodes associated with the telecommunications network and data repositories that are configured to store data records associated with the network nodes. The data redundancy allocation system may include network node routing list that is used to direct data records associated with the network nodes to one of the available data repositories. In one example, the network node routing list may include a list of multiple data repositories along with a designation of one data repository as an active repository. Additionally, or alternatively, the network node routing list may include a priority assignment for each data repository that designates an order of data repositories that the data redundancy allocation system should adhere to when transmitting data records associated with network nodes. For example, consider a network node routing list for a particular network node that designates a first, second, and third data repository with corresponding priority assignments of one, two, and three. In this example, the data redundancy allocation system may designate the first data repository as the active repository and transmit data records associated with the network node to the first data repository, based on the priority assignment. Should the second or third data repositories become non-operational, or be brought offline due to planned maintenance, the data redundancy allocation system would maintain the designation of the first data repository as the active repository and continue to transmit data records associated with the network node to the first data repository. Moreover, in the event, the first data repository becomes non-operational, the data redundancy allocation system may designate the second data repository as the active repository and transmit data records associated with the network node to the second data repository, based on its next highest priority assignment and so forth.

The term "data record," as used herein describes any form of data associated with the operation of a client device on a telecommunication network. By way of example, a data record may include a charging data record associated with a client account. Charging data records may include one or more of a client device identifier, a recipient device identifier, a voice call duration, time stamp associated with a voice or data communication, data usage associated with a data communication, or any combination thereof.

The term "network node," as used herein describes a node facilitates communication traffic over the telecommunication network. In a non-limiting example, a network node may facilitate communication traffic such as, packet switch traffic, circuit switch traffic, Voice over Long Term Evolution (VoLTE) traffic, Wi-Fi voice traffic, data metering traffic, short messaging service (SMS) traffic, multi-media messaging service (MMS) traffic, or any combination thereof. Further, a network node may correspond to one of a Packet Data Network Gateway (PGW), a mobile switching station (MSS), a Serving GPRS Support Node (SGSN), a Gateway GPRS Support Node (GGSN), and so forth.

The term "data repository" as used herein, describes a configuration of a data cluster that includes a plurality of logical servers that are configured to store data records associated with the network nodes. The data cluster, and corresponding logical servers, may include one or more interface(s) that enable communications with other networked devices, such as the DRA system. It is noteworthy, that a telecommunications service provider may selectively maintain a multiple data clusters (i.e., multiple data repositories), each of which include a plurality of logical servers in order to manage a volume of data records associated with the network nodes.

The DRA system may determine that a data repository is non-operational by monitoring the operational integrity of the data cluster. For example, the DRA system may initiate a communicative connection with the data cluster using a secure shell file transfer protocol (SFTP). In this way, should the DRA system fail to establish the communicative connection via the SFTP, the DRA system may selectively determine that the data cluster is non-operational. In some examples, the DRA system may monitor the operational integrity of the data cluster on a continuous basis, per a predetermined schedule, or in response to a triggering event. The predetermined schedule may be set by an operator of the DRA system or telecommunications service provider. The triggering event may correspond to receipt of a data record from a network node that is intended for storage and/or processing by the data cluster. Alternatively, the triggering event may correspond to receipt of a communication relating to the operational integrity of the data cluster.

In the event that the DRA system determines that a primary data cluster (i.e., active repository) is non-operational, the DRA system may identify, via a network node routing list, the corresponding standby repository. The standby repository may comprise of an alternate data cluster along with an associated alternate logical server. In some examples, a telecommunications service providers may selectively maintain a redundancy of data repositories (i.e., active repository and standby repository) at a substantially same geographic location. In other examples, an active repository and a corresponding standby repository may be located at different geographic locations.

Further, the DRA system may modify individual routing policies of data records associated with network nodes that were initially directed towards the non-operational, primary data cluster. The modified routing policies may selectively re-direct forthcoming data records from the non-operational, primary data cluster, to the alternate logical server associated with the alternate data cluster (i.e., standby repository). In a non-limiting example, the DRA system may modify a routing policy by adjusting the "active repository" designation associated with the network node on the network node routing list. In this example, the DRA system may adjust the active repository designation to identify the alternate data cluster and the alternate logical server.

In some examples, in response to determining that a data cluster is non-operational, the DRA system may parse through the network node routing list to identify substantially all network nodes that designate the non-operational data cluster (i.e., primary data cluster) as an active repository. In doing so, the DRA system may modify individual routing policies for data records associated with the network nodes to selectively re-direct delivery of forthcoming data records from the non-operational data cluster (i.e., primary data cluster), to an alternate data cluster and associated alternate logical server (i.e., standby repository).

Moreover, the DRA system may receive an indication that a previously non-operational data cluster (i.e., primary data cluster), has been repaired and is now operational. In doing so, the DRA system may selectively adjust the individual routing policy for substantially all network nodes that had initially designated the non-operational data cluster as an active repository. The adjustment of the individual routing policy may comprise of designating the primary logical server associated with the primary data cluster (i.e., previously non-operational data cluster, which is now operational), as the active repository for storage of substantially all forthcoming data records.

In various examples, the DRA system may selectively monitor data usage associated with logical servers of a data cluster. Particularly, a logical server may run multiple configurations to process a data record. Each of these configurations may use storage within a file system. By monitoring the storage in the file system, the DRA system may determine the data usage associated with the logical server. In doing so, the DRA system may identify an overloaded logical server by determining that data usage on the overload logical server has met or exceeded a predetermined data usage threshold. The predetermined data usage threshold may correspond to a storage capacity and/or processing capability of the logical server. In one example, the predetermined data usage threshold may be set by an operator of the telecommunications network to provide a buffer to exceeding the storage capacity and/or processing capability of the logical server. In some examples, the DRA system may monitor data usage associated with logical servers on a continuous basis, per a predetermined schedule, or in response to a triggering event. The predetermined schedule may be set by an operator of the DRA system or telecommunications service provider. The triggering event may correspond to receipt of a data record from a network node that is intended for delivery to the logical server or the data cluster associated with the logical server. Alternatively, the triggering event may correspond to receipt of a communication relating to the operational integrity of the logical server.

Moreover, the DRA system may dynamically re-allocate one or more data records stored on the overloaded logical server to an additional logical server within the data cluster. The DRA system may select the additional logical server based on its data usage relative to data usage on the overloaded logical server (that has met or exceeded the predetermined data usage threshold), relative to the predetermined data usage threshold, or a combination of both.

In one example, the DRA system may identify a number of network nodes with associated data records stored on an overloaded logical server, whereby data usage consumed by the associated data records account for the portion of data usage above the predetermined data usage threshold. By way of example, the DRA system may determine that the overloaded logical server has exceeded a predetermined data usage threshold by four gigabytes. In doing so, the DRA system may identify individual data records that account for the four gigabytes, and further re-allocate those individual data records to an additional logical server with available data capacity.

In addition to re-allocating the number of individual data records, the DRA system may modify routing policies of the associated network nodes to ensure that forthcoming data records associated with the network nodes are transmitted to the additional logical server in lieu of the overloaded logical server. For example, the DRA system may first identify the network nodes associated with the data records being re-allocated. In doing so, the DRA system may modify individual routing policies associated with the network nodes to designate the additional logical server as the storage location for substantially all forthcoming data records from the network node. In a non-limiting example, the DRA system may modify a routing policy for a particular network node within the network node routing list, by adjusting the "active repository" designation for the particular network node to designate the additional logical server in lieu of the overloaded logical server.

Additionally, the DRA system may pre-emptively determine that a data cluster is non-operational based at least in part on the performance state of the logical servers associated with the data cluster. The performance state of a logical server may be based on an amount of storage capacity and/or processing capability of a logical server that is used for storage or processing data records. The performance state of a logical server may be presented relative to a predetermined data usage threshold, which may equate to a storage capacity and/or processing capability of the logical server. Specifically, the DRA system may pre-emptively determine that a data cluster is non-operational if a predetermined threshold number of logical servers associated with the data cluster have an amount of data usage that exceeds the predetermined data usage threshold. The threshold number of logical servers may be set by an operator of the DRA system or an operator of the telecommunication network. In a non-limiting example, consider a data cluster with sixteen logical servers. The DRA system may pre-emptively determine that the data cluster is non-operational if twelve logical servers (i.e., predetermined number of logical servers) have used an amount of data storage that is greater than the predetermined data usage threshold. The benefit of a preemptive policy is to ensure that any additional forthcoming data records are not lost due to a lack of storage capability.

In some examples, a data cluster may comprise of subsets of logical servers, with each subset of logical servers storing data records for a particular type of network node. By way of example, a first subset of logical servers may store data records associated a Packet Data Network Gateway (PGW) network nodes, and a second subset of logical servers may store data records associated with a mobile switching station (MSS). Each subset of logical servers may include any number of logical servers that is proportional to an anticipate volume of data records. In these examples, the DRA system may selectively re-allocate data records from an overloaded logical server that resides within a subset of logical servers to an additional logical server within the same subset of logical servers. Additionally, the DRA system may determine that a data cluster is non-operational in response to determining that a predetermined number of logical servers that reside within a subset of logical servers have an amount of data usage that exceeds a predetermined data usage threshold.

Further, the term "techniques," as used herein, may refer to system(s), method(s), computer-readable instruction(s), module(s), algorithms, hardware logic, and/or operation(s) as permitted by the context described above and through the document. Additionally, the techniques described herein may be implemented in a number of ways. Example implementations are provided below with reference to the following figures.

FIG. 1 illustrates a schematic view of a computing environment 100 that facilitates a Data Redundancy Allocation (DRA) system 102. Particularly, a DRA system 102 may monitor network node traffic from one or more network node(s) 104(1)-104(N), and dynamically re-direct network node traffic to a first data repository 106 or a second data repository 108. The network node traffic may correspond to data records associated with a client device operating on a telecommunications network.

In the illustrated example, the telecommunications network may provide telecommunications and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth. The computing environment 100 may include a core network 110. The core network 110 may provide telecommunication and data communication services to multiple client devices, such as a 3G-compatible client device and an LTE an LTE-compatible client device, collectively referred to as client device. The client device may include any sort of electronic device, such as a cellular phone, a smart phone, a tablet computer, an electronic reader, a media player, a gaming device, a personal computer (PC), a laptop computer, etc. The client device may include a subscriber identity module (SIM), such as an eSIM, to identify the client device to a telecommunication service provider network (also referred to herein, as "telecommunication network").

In the illustrated example, the core network 110 may further include one or more network node(s) 104(1)-104(N), the DRA system 102, a first data repository 106 and a second data repository 108. The one or more network node(s) 104(1)-104(N) may correspond to nodes that facilitate communication traffic over the telecommunication network. The network node(s) 104(1)-104(N) may to one of a Packet Data Network Gateway (PGW), a mobile switching station (MSS), a Serving GPRS Support Node (SGSN), a Gateway GPRS Support Node (GGSN) and so forth.

Additionally, the DRA system 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interface(s) to enable communications with other networked devices, such as the one or more network nodes 104(1)-104(N).

Moreover, the first data repository 106 may comprise of one or more data clusters 112(1)-112(N), each of which include a plurality of logical servers. Similarly, the second data repository 108 may comprise of one or more data clusters 114(1)-114(N), each of which include a plurality of logical servers. The first data repository 106 and the second data repository 108 are intended to store and/process data records transmitted by the one or more network nodes 104(1)-104(N), and delivered via the DRA system 102. In some examples, the first data repository 106 and the second data repository 108 may be located at a substantially similar geographic location. In other examples, the first data repository 106 and the second data repository 108 may be located at different geographic locations. It is noteworthy that even though the illustrated example depicts a first data repository 106 and a second data repository 108, embodiments of the present invention may be implemented using any multiple of data repositories.

Further, the one or more network nodes 104(1)-104(N), the DRA system 102, the first data repository 106 may communicate via one or more network(s). The one or more network(s) may include public networks such as the Internet, private networks such as an institutional and/or personal intranet, or some combination of private and public networks. The one or more network(s) can also include any type of wired and/or wireless network, including but not limited to local area network (LANs), wide area networks (WANs), satellite networks, cable networks, Wi-Fi networks, Wi-Max networks, mobile communications networks (e.g., 3G, 4G, and so forth), or any combination thereof.

Figure 2A:
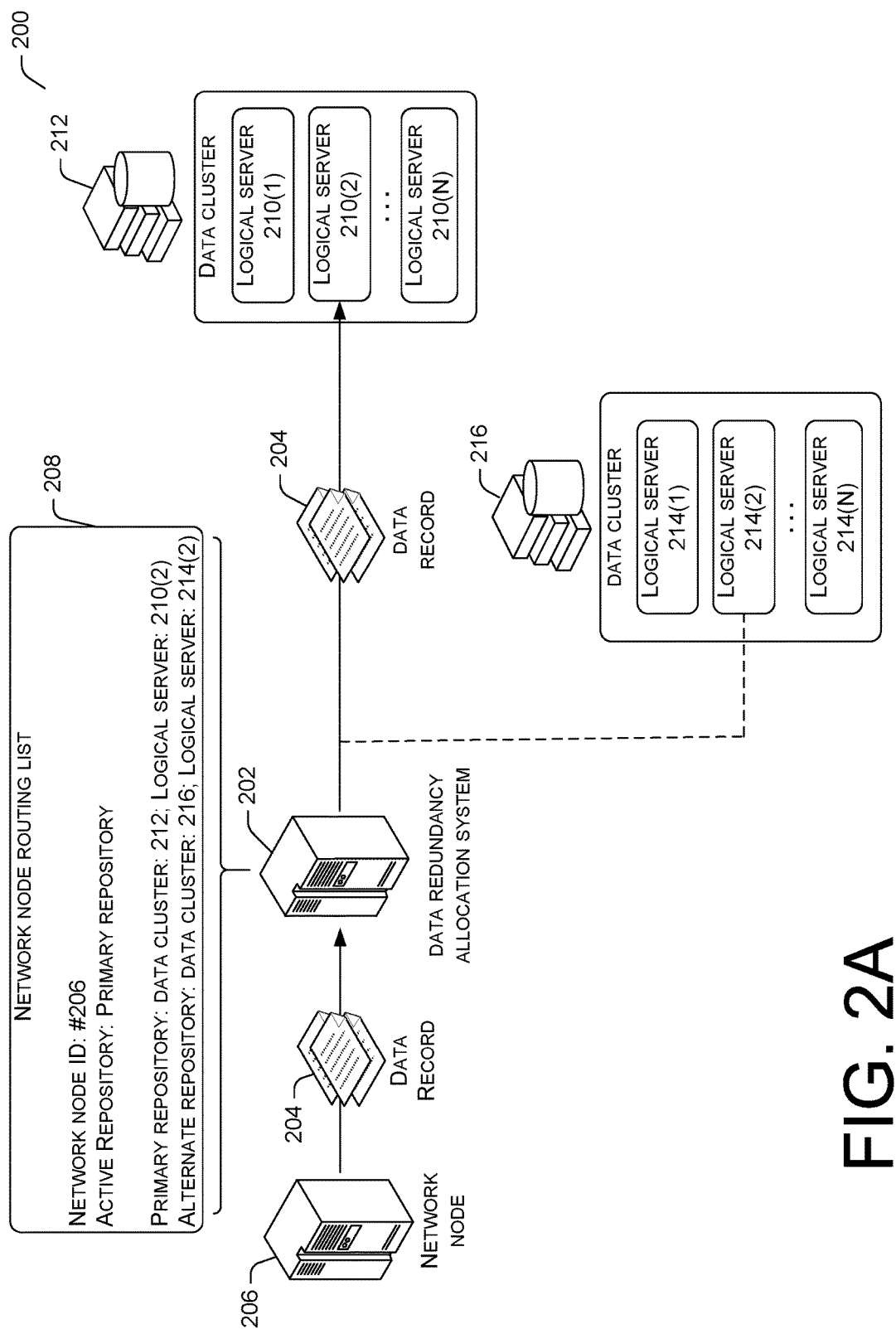
FIGS. 2A and 2B illustrate a schematic view of a Data Redundancy Allocation (DRA) system transmitting a data record associated with a network node to an active repository associated with the telecommunications network.
Figure 2B:
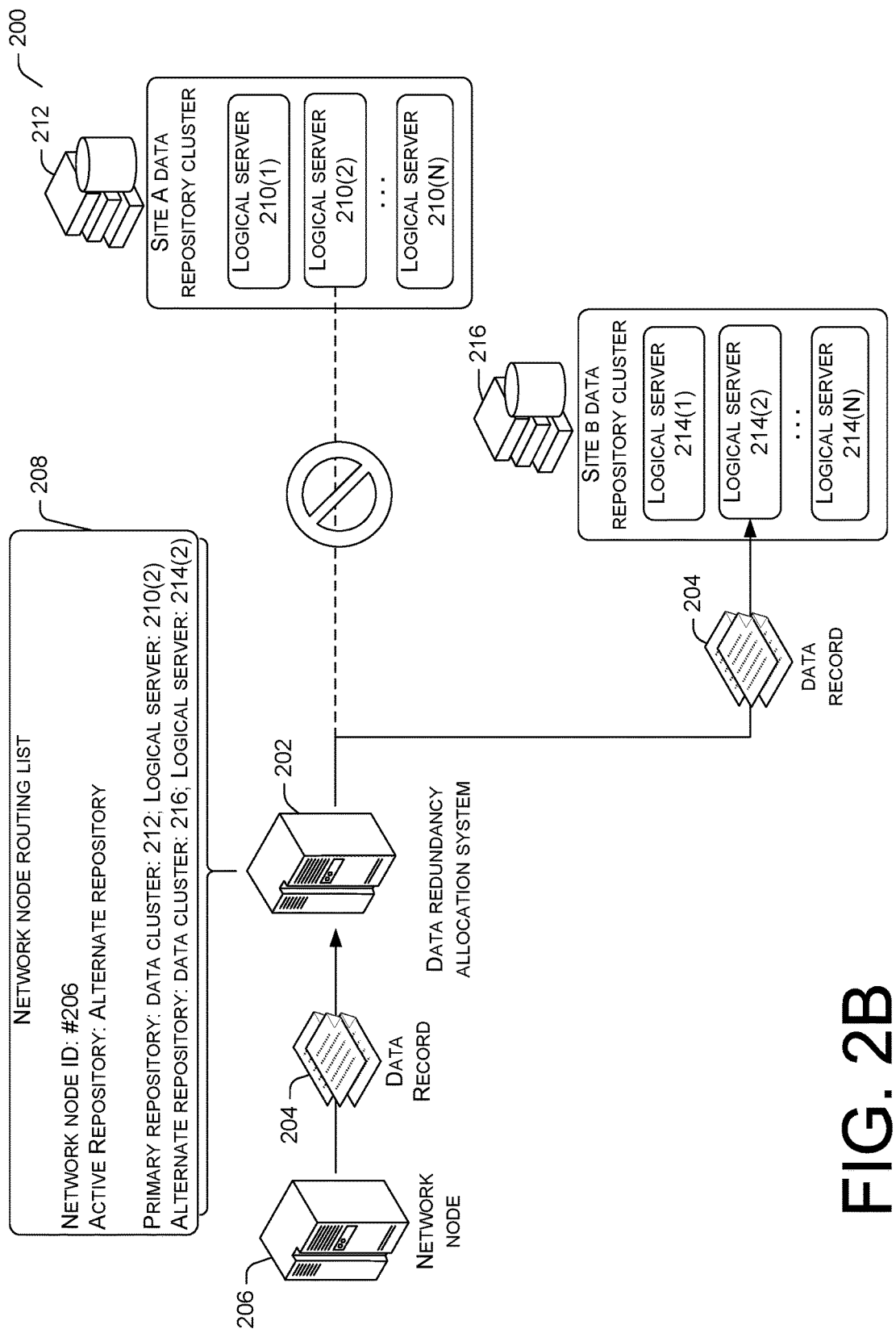

FIGS. 2A and 2B illustrate a schematic view of a Data Redundancy Allocation (DRA) system 202 transmitting a data record 204 associated with a network node 206 to an active repository associated with the telecommunications network. FIG. 2A illustrates an example of the DRA system 202 transmitting the data record 204 to the primary repository associated with the network node 206, per the network node routing list 208. Further, FIG. 2B illustrates an example of the DRA system 202 transmitting the data record 204 to an alternate repository associated with the network node 206, per the network node routing list 208. The DRA system 202 may correspond to DRA system 102.

In FIG. 2A, the DRA system 202 may receive a data record 204 from a network node 206. Network node 206 may correspond to one of network node(s) 104(1)-104(N). Further, the data record 204 may correspond to a charging data record associated with an operation of client device on a telecommunications network. Further, the network node 206 may correspond to a node that facilitates communications traffic over the telecommunications network. The DRA system 202 may identify, network node entry for the network node 206 on a network node routing list 208. The network node entry may identify a primary repository and an alternate repository, and further designate an active repository for delivery of data records associated with the network node 206. In FIG. 2A, the network node entry associated with network node 206 designates the primary repository as the active repository.

In the illustrated example, the primary repository may comprise of a storage location on a logical server 210(2) associated with a data cluster 212. Similarly, the alternate repository may comprise of a storage location on a logical server 214(2) associated with a data cluster 216. The data cluster 212 may correspond to one of data cluster(s) 112(1)-112(N) and data cluster 216 may correspond to one of data cluster(s) 114(1)-114(N). Further, data cluster 212 may comprise of one or more logical server(s) 210(1)-210(N), and data cluster 216 may comprise of one or more logical server(s) 214(1)-214(N).

Further, the DRA system 202 may identify, via the network node routing list 208, the active repository as data cluster 212 and logical server 210(2) (i.e., primary repository). In doing so, the DRA system 202 may determine an operational integrity of the data cluster 212. In one example, the DRA system 202 may attempt to initiate a communicative connection with data cluster 212 via a secure shell file transfer protocol (SFTP). By establishing the communicative connection, the DRA system 202 may determine that data cluster 212 is operational. Thus, the DRA system 202 may transmit the data record 204, and all forthcoming data records, to the logical server 210(2) associated with data cluster 212 (i.e., active repository, primary repository).

In FIG. 2B, the DRA system 202 may initially identify, via the network node routing list 208, the active repository as data cluster 212 and logical server 210(2) (i.e., primary repository). However, the DRA system 202 may further determine that data cluster 212 is non-operational, based at least in part on a failed attempt to initiate a communicative connection with data cluster 212 via SFTP. In this regard, the DRA system 202 may identify, via the network node routing list 208, an alternate repository as data cluster 216 and logical server 214(2). In doing so, the DRA system 202 may adjust a routing policy associated with the network node 206 on the network node routing list 208 to designate the alternate repository (i.e., data cluster 216 and logical server 214(2)) as the active repository. Thus, the DRA system 202 may transmit the data record 204, and all forthcoming data records, to the logical server 214(2) associated with data cluster 216 (i.e., active repository, alternate repository).

FIG. 3 illustrates a block diagram of a Data Redundancy Allocation (DRA) system the facilitates determining a data usage of a logical server and dynamically re-allocating data records associated with network nodes to relieve an overloaded logical server.

At block 302, the DRA system may associate, via a network node routing list, one or more logical servers 304(1)-304(N) into subsets of logical servers 306(1)-306(N) within a data cluster 308. Data cluster 308 may correspond to one of data cluster(s) 112(1)-112(N) or data cluster(s) 114(1)-114(N). In one example, each subset may be configured to store data records for a particular type of network node. By way of example, one subset of logical servers may store data records associated with Packet Data Network Gateway (PGW) network nodes, while another subset of logical servers may store data records associated with a mobile switching station (MSS). Each of the subset of logical servers 306(1)-306(N) may include any number of logical servers that is proportional to an anticipated volume of data records.

At block 310, the DRA system may determine a data usage 312(1)-312(N) associated with individual logical servers 304(1)-304(N) within a data cluster 308, relative to a data usage threshold 314. Data usage 312(1)-312(N) may correspond to an amount of storage capacity and/or processing capability of a logical server that is used for storage or processing data records. The predetermined data usage threshold 314 may correspond to a storage capacity and/or processing capability of the logical server. In one example, the predetermined data usage threshold 314 may be set by an operator of the telecommunications network to provide a buffer to exceeding the storage capacity and/or processing capability of the logical server.

In the illustrated example, the DRA system may identify a logical server 304(2) whereby the data usage has exceeded the predetermined data usage threshold 314. In this example, the DRA system may quantify a number of network nodes with associated data records stored on the logical server 304(2) that correspond to the portion of data usage 316 that is above the predetermined data usage threshold 314.

At block 318, the DRA system may dynamically re-allocate the data records associated with the portion of data usage 316 that is above the predetermined data usage threshold 314. Particularly, the DRA system may identify an additional logical server with available storage capacity and/or processing capability to relieve the overloaded logical server. In some examples, the DRA system may identify an additional logical server that is within a same subset of logical servers as the overloaded logical server. In the illustrated example, the DRA system may dynamically re-allocate the portion of data usage 316 from logical server 304(2) to logical server 304(3), whereby the logical server 304(2) and 304(3) belong to the subset of logical server 306(1). In doing so, the DRA system may have provided logical server 304(2) with sufficient relief to reduce its data usage to the predetermined data usage threshold 314, or below the predetermined data usage threshold 314.

Figure 4:
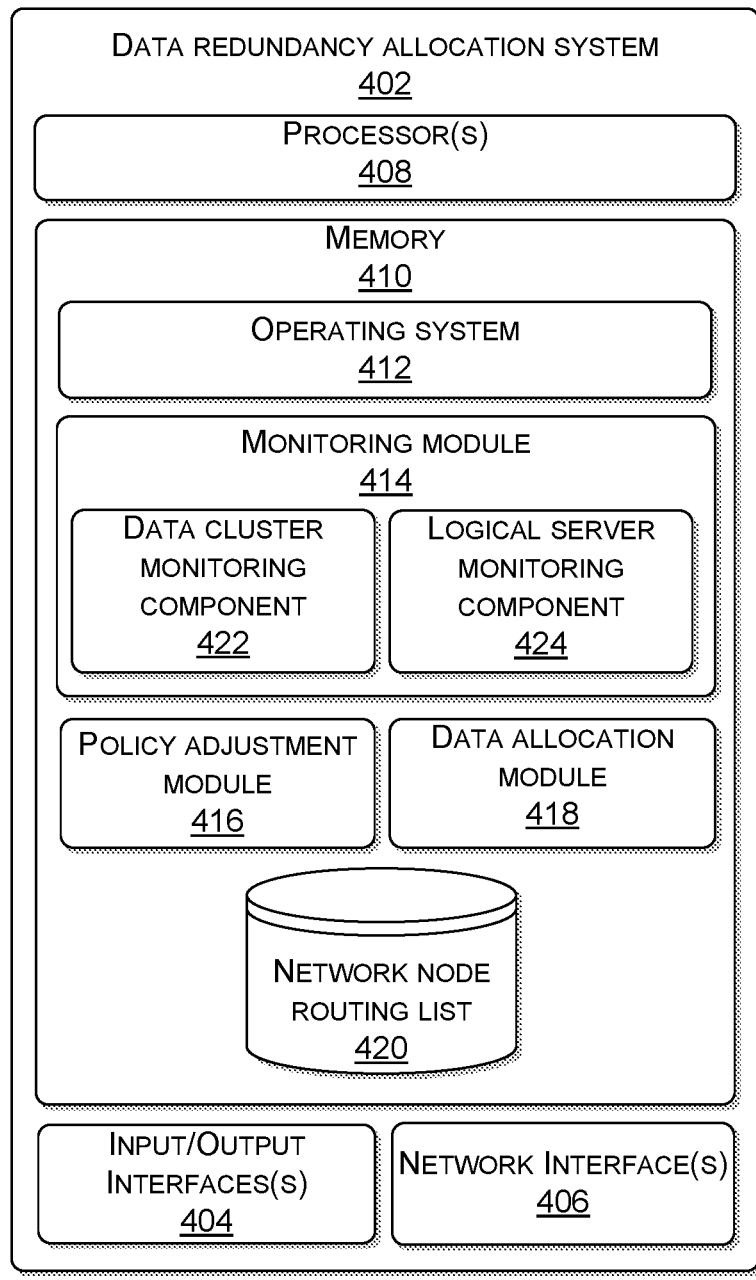
FIG. 4 illustrates a block diagram of a Data Redundancy Allocation (DRA) System that monitors network node traffic and dynamically re-directs network node traffic from a non-operational data repository to a standby, redundant, data repository.

FIG. 4 illustrates a block diagram of a Data Redundancy Allocation (DRA) system 402 that monitors network node traffic and dynamically re-directs network node traffic from a non-operational data repository to a standby, redundant, data repository. Particularly, the DRA system 402 may monitor the operational integrity of data clusters and logical servers associated with an active repository, and in doing so, transition a forthcoming flow of data records to a standby repository (i.e., alternate data cluster and alternate logical server) in response determining that the primary data cluster is non-operational.

The DRA system 402 may include routines, program instructions, objects, and/or data structures that perform particular tasks or implement abstract data types. Further, the DRA system 402 may include input/output interface(s) 404. The input/output interface(s) 404 may include any type of output interface known in the art, such as a display (e.g., a liquid crystal display), speakers, a vibrating mechanism, or a tactile feedback mechanism. Input/output interface(s) 404 also include ports for one or more peripheral devices, such as headphones, peripheral speakers, or a peripheral display. Further, the input/output interface(s) 404 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the DRA system 402 may include network interface(s) 406. The network interface(s) 406 may include any sort of transceiver known in the art. For example, the network interface(s) 406 may include a radio transceiver that performs the function of transmitting and receiving radio frequency communications via an antenna. In addition, the network interface(s) 406 may also include a wireless communication transceiver and a near field antenna for communicating over unlicensed wireless Internet Protocol (IP) networks, such as local wireless data networks and personal area networks (e.g., Bluetooth or near field communication (NFC) networks). Further, the network interface(s) 406 may include wired communication components, such as an Ethernet port or a Universal Serial Bus (USB).

Further, the DRA system 402 may include one or more processor(s) 408 that are operably connected to memory 410. In at least one example, the one or more processor(s) 408 may be a central processing unit(s) (CPU), graphics processing unit(s) (GPU), a both a CPU and GPU, or any other sort of processing unit(s). Each of the one or more processor(s) 408 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 408 may also be responsible for executing all computer applications stored in the memory, which can be associated with common types of volatile (RAM) and/or nonvolatile (ROM) memory.

In some examples, memory 410 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 410 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 410 may include an operating system 412, a monitoring module 414, a policy adjustment module 416, a data allocation module 418, and a network node routing list 420. The operating system 412 may be any operating system capable of managing computer hardware and software resources.

Further, the monitoring module 414 may further include a data cluster monitoring component 422 and a logical server monitoring component 424. The data cluster monitoring component 422 may monitor the operational integrity of one or more data cluster(s) used to store and/or process data records associated a telecommunications network. In doing so, the data cluster monitoring component 422 may transmit an indication to the policy adjustment module 416 indicating the operational integrity of a data cluster.

The data cluster monitoring component 422 may monitor the operational integrity of one or more data cluster(s) on a continuous basis, per a predetermined schedule, or in response to a triggering event. The predetermined schedule may be set by an operator of the DRA system or telecommunications service provider. The triggering event may correspond to receipt of a data record from a network node that is intended for delivery to the data cluster. Alternatively, the triggering event may correspond to receipt of a communication relating to the operational integrity of a data cluster.

In one example, the data cluster monitoring component 422 may determine whether a data cluster is operational by initiating a communicative connection with the data cluster using a secure shell file transfer protocol (SFTP). In this way, the data cluster may be considered operational in response to establishing the communicative connection via SFTP. Alternatively, should the data cluster monitoring component 422 fail to establish the communicative connection, the data cluster may be selectively determined as non-operational.

In another example, the data cluster monitoring component 422 may determine whether a data cluster is operational, based on an indication received from the logical server monitoring component 424 that indicates the performance state of logical servers within the data cluster. More specifically, the data cluster monitoring component 422 may receive an indication of a number of logical servers within a data cluster that have an amount of data usage that exceeds a predetermined data usage threshold. Further, the data cluster monitoring component 422 may pre-emptively determine that the data cluster is non-operational in response to the number of logical servers being greater than a threshold number of logical servers. The threshold number of logical servers may be set by an operator the DRA system 402 or an operator of the telecommunications network.

In some examples, a data cluster may comprise of a multiple subsets of logical servers, with each subset of logical servers storing data records for a particular type of network node. In this example, the data cluster monitoring component 422 may determine that a data cluster is non-operational in response to determining that a predetermined number of logical servers that reside within a subset of logical servers have an amount of data usage that exceeds the predetermined data usage threshold.

Additionally, the logical server monitoring component 424 of the monitoring module 414 may monitor the performance state of logical servers within a data cluster. The performance state of a logical server may be based on an amount of storage capacity and/or processing capability of a logical server that is used for storage or processing data records. The performance state of a logical server may be presented relative to a predetermined data usage threshold, which may equate to a storage capacity and/or processing capability of the logical server. For example, a logical server may be overloaded in response to determining that data usage has met or exceeded the predetermined data usage threshold. The predetermined data usage threshold may correspond to a storage capacity and/or processing capability of the logical server. Alternatively, the predetermined data usage threshold may be set by an operator of the telecommunications network to provide a buffer to exceeding the storage capacity and/or processing capability of the logical server.

In some examples, the logical server monitoring component 424 may transmit an indication of one or more overloaded logical servers to the data cluster monitoring component 422, the policy adjustment module 416, the data allocation module 418, or any combination thereof. The data cluster monitoring component 422 may determine whether a threshold number of logical servers have exceeded the predetermined data usage threshold, thereby pre-emptively deeming the data cluster itself as non-operational. The policy adjustment module 416 may selectively re-direct forthcoming data records away from overloaded logical servers, to alternate logical servers within the data cluster that have available capacity. The data allocation module 418 may re-allocate data records associated with network nodes away from an overloaded logical server to alternate logical servers within the data cluster that have available capacity.

Further, the logical server monitoring component 424 may monitor data usage associated with logical servers on a continuous basis, per a predetermined schedule, or in response to a triggering event. The predetermined schedule may be set by an operator of the DRA system 402 or the telecommunications service provider. The triggering event may correspond to receipt of a data record from a network node that is intended for delivery to the logical server or the data cluster associated with the logical server. Alternatively, the triggering event may correspond to receipt of a communication relating to the operational integrity of the logical server.

Additionally, the policy adjustment module 416 may modify individual routing policies associated with individual network nodes to route forthcoming data records from an initial data cluster and logical server combination, to an alternate data cluster and logical server combination. In some examples, the policy adjustment module 416 may adjust the "active repository" designation associated with a network node on the network node routing list 420 to identify the alternate data cluster and logical server combination. In one example, the policy adjustment module 416 may receive an indication from the data cluster monitoring component 422 that a primary data cluster (i.e., active repository) is no longer operational. In doing so, the policy adjustment module 416 may identify, via the network node routing list 420, one or more affected network nodes associated with the primary data cluster. Further, for each affected network node, the policy adjustment module 416 may further identify, via the network node routing list 420, a standby repository (i.e., alternate data cluster and corresponding alternate logical server) for forthcoming data records. In doing so, the policy adjustment module 416 may modify the individual routing policies on the network node routing list, for each of the affected network nodes, to identify the alternate data cluster and the alternate logical server as the active repository. In this regard, substantially all forthcoming data records sent by the affected network nodes would be re-directed to the alternate logical servers that associated with the alternate data clusters.

Additionally, or alternatively, the policy adjustment module 416 may adjust the "active repository" designation with a network node on the network node routing list 420 to identify an alternate logical server, based at least in part on an indication received from the logical server monitoring component 424, the data allocation module 418, or a combination of both. Particularly, the logical server monitoring component 424 and/or the data allocation module 418 may indicate that a particular logical server is overloaded, and that a data records associated with one or more network nodes have been re-allocated to an alternate logical server. In this regard, the policy adjustment module 416 may adjust the routing policies associated with the one or more network nodes to ensure that forthcoming data records are re-directed to the alternate logical server, rather than the overloaded logical server.

Moreover, the data allocation module 418 may receive an indication from the logical server monitoring component 424 that data usage associated with a logical server has met or exceeded a predetermined data usage threshold (i.e., logical server is overloaded). In doing so, the data allocation module 418 may identify one or more additional logical server(s) within the data cluster that have available storage capacity and/or processing capability to relieve the overloaded logical server. In some examples, the data allocation module 418 may select one or more additional logical servers that reside within a subset of logical servers associated with the overloaded logical server. The data allocation module 418 may further identify a number of network nodes with associated data records stored on the overloaded logical server, whereby data usage consumed by the associated data records accounts for the portion of data usage that is above the predetermined data usage threshold. In doing so, the data allocation module 418 may dynamically re-allocate the data records associated with the identified network nodes to the one or more additional logical servers.

The network node routing list 420 may include individual entries of each network node associated with the telecommunications network. Each individual entry may include a network node identifier, an active repository, a primary repository, and one or more alternate repositories. The active repository corresponds to one of the primary repository or one of the alternate repositories. Further, each of the primary repository and one or more alternate repositories include a data cluster and a logical server associated with the data cluster. In one example, the active repository is set by default to the primary repository. In the event that the primary repository becomes non-operational, the DRA system 402 may selectively re-direct forthcoming data records to one of the alternate repositories. In the event that multiple alternate repositories are included in a network node entry, the network node entry may further include a priority assignment for each of the alternate repositories. The priority assignments are intended to determine a priority order for multiple alternate repositories. Thus, a selection of an alternate repository may be based on the priority assignment associated with each of the alternate repositories.

In some examples, each individual entry for a network node may indicate whether the network node is associated with a subset of logical servers. For example, a data cluster may include subsets of logical servers that are intended to store data records for particular types of network nodes. Thus, the network node routing list 420 may further include an additional identifier (i.e., logical server subset identifier) that identifies the subset of logical servers.

Figure 5:
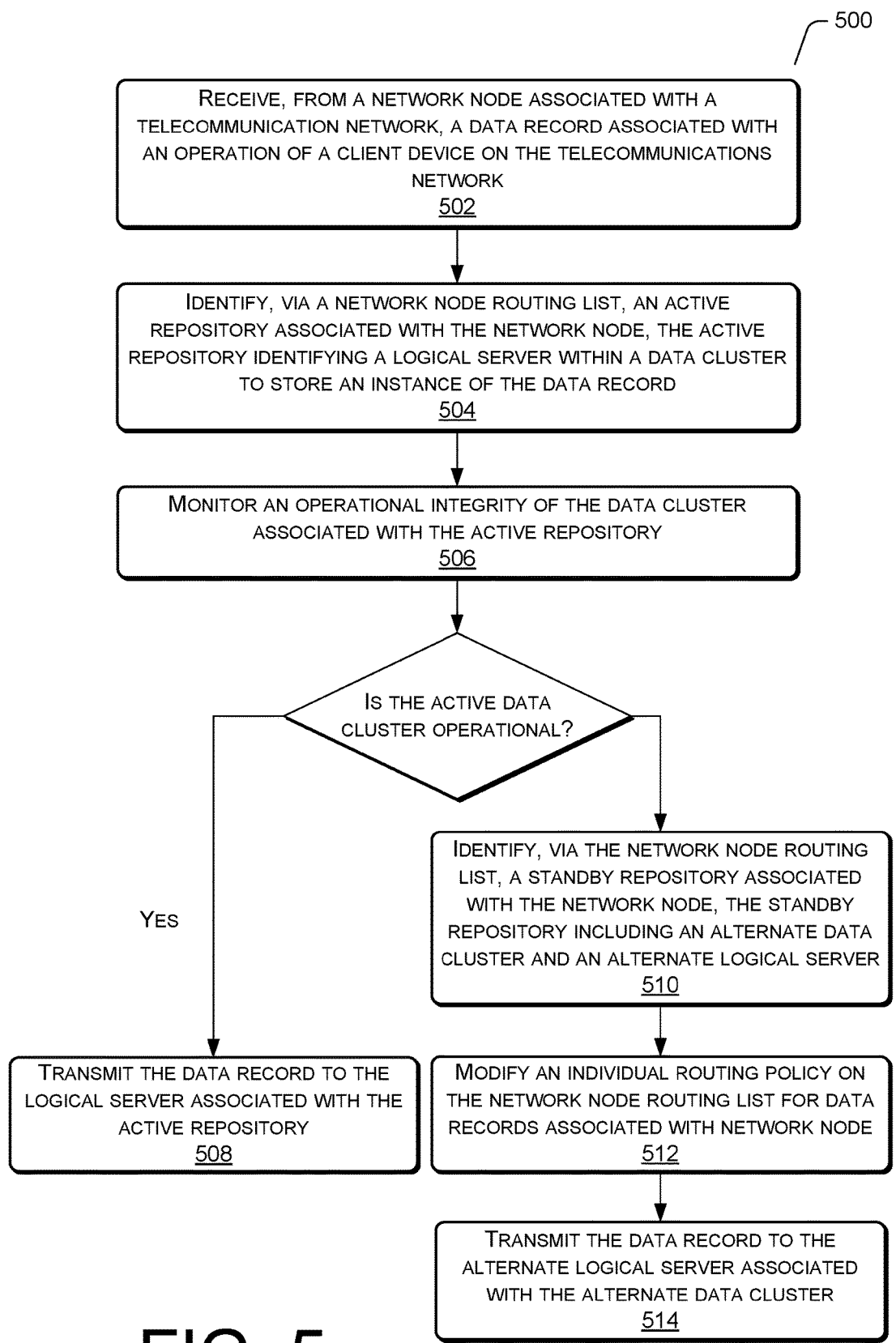
FIG. 5 illustrates a block diagram of a Data Redundancy Allocation (DRA) system process that re-directs delivery of data records from a non-operational data cluster to a standby, alternate data cluster and associated logical server.
Figure 6:
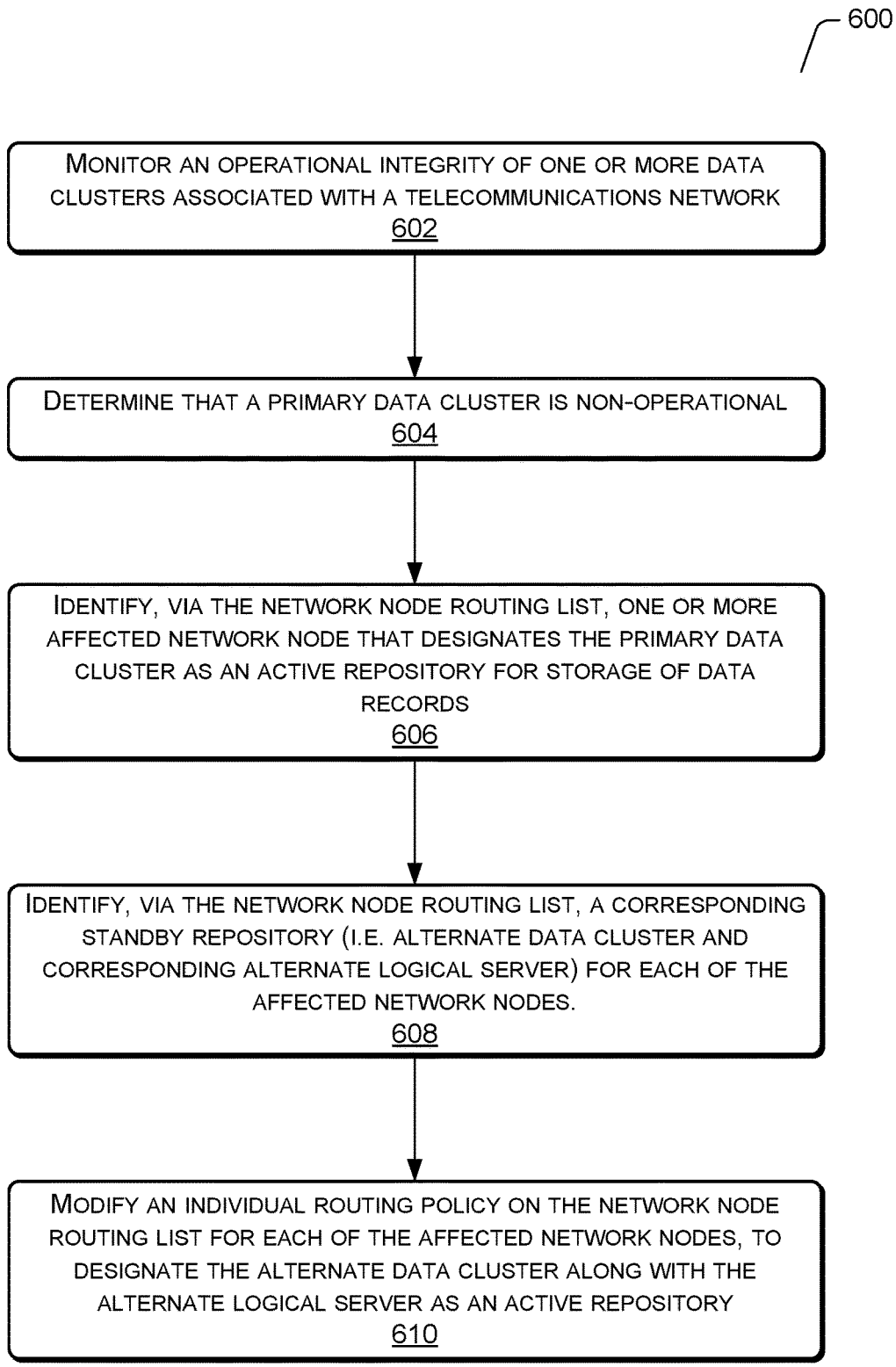
FIG. 6 illustrates a block diagram of a Data Redundancy Allocation (DRA) system process that identifies substantially all network nodes that designate a non-operational data cluster (i.e., primary data cluster) as an active repository.
Figure 7:
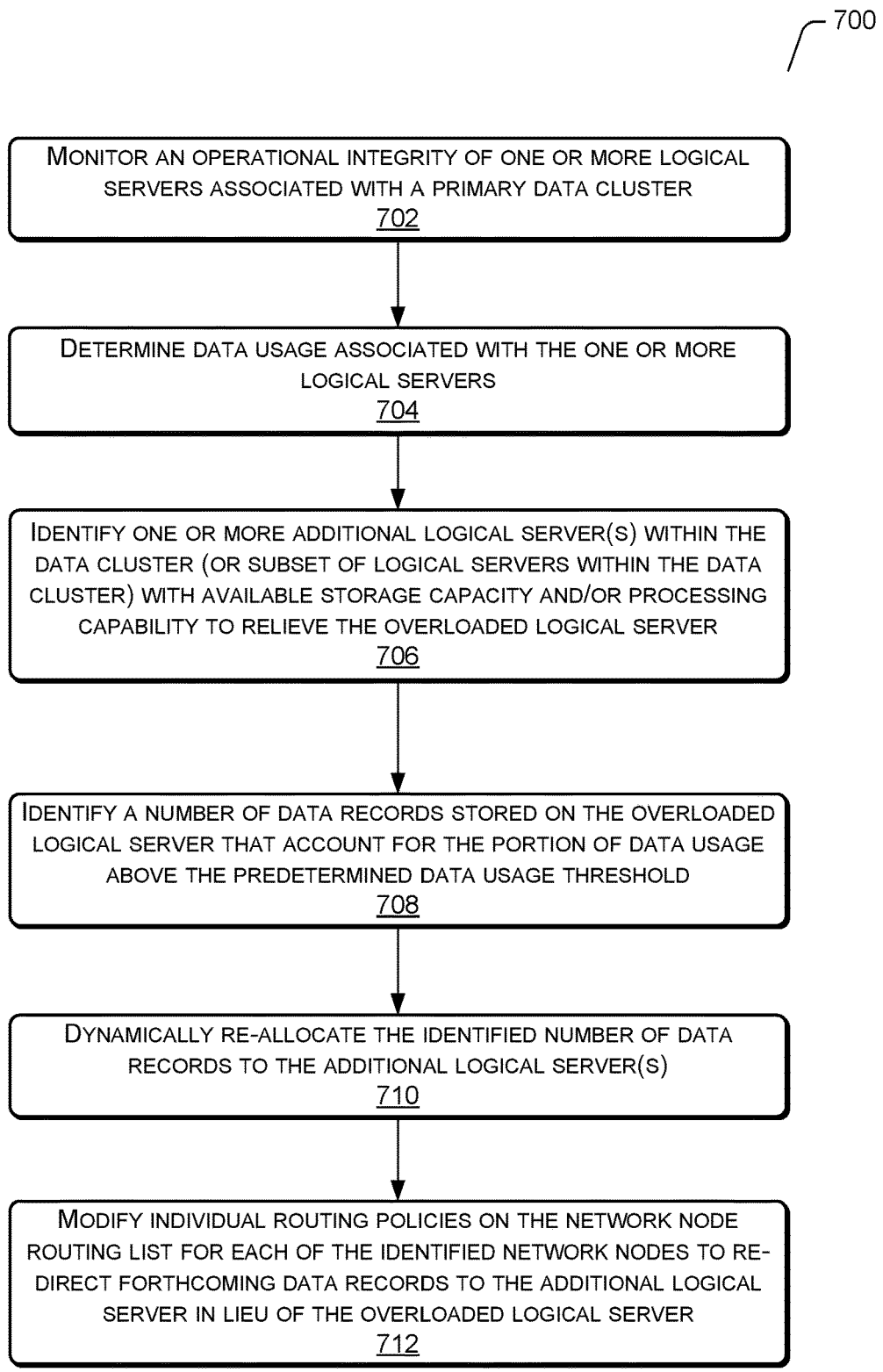
FIG. 7 illustrates a block diagram of a Data Redundancy Allocation (DRA) system process that monitors the operational integrity of one or more logical servers associated with a primary data cluster.

FIGS. 5, 6, and 7 present processes 500, 600, and 700 that relate to operations of the Data Redundancy Allocation System. Each of processes 500, 600, and 700 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500, 600, and 700 are described with reference to the computing environment 100 of FIG. 1.

FIG. 5 illustrates a block diagram of a Data Redundancy Allocation (DRA) system that re-directs delivery of data records from a non-operational data cluster to a standby, alternate data cluster and associated logical server (i.e., standby repository). In some examples, the standby, alternate data cluster and associated logical server may be associated with the network node via a network node routing list. In this regard, in the event that an active repository is inadvertently or intentionally brought offline, the DRA system may parse through the network node routing list to identify the standby repository (i.e., alternate data cluster and associated alternate logical server) associated with the network node and further transition delivery of forthcoming data records without delay.

At 502, the DRA system may receive, from a network node associated with a telecommunications network, a data record associated with an operation of a client device on the telecommunications network. In one example, the data record may correspond to a charging data record associated voice and data communications initiated by the client device over the telecommunications network. Further, the network node may correspond to a node that facilitates communication traffic over the telecommunication network, such as a Packet Data Network Gateway (PGW), a mobile switching station (MSS), a Serving GPRS Support Node (SGSN), a Gateway GPRS Support Node (GGSN), or any combination thereof.

At 504, the DRA system may identify, via a network node routing list, an active repository associated with the network node. The active repository may correspond to a default storage location of data records received from the network node. Particularly, the active repository for the network node may comprise of a storage location on a logical server associated with a data cluster.

At 506, the DRA system may monitor an operational integrity of the data cluster associated with the active repository. In one example, the DRA system may initiate a communicative connection with the data cluster using a secure shell file transfer protocol (SFTP). In this way, should the DRA system fail to establish the communicative connection via the SFTP, the DRA system may selectively determine that the data cluster is non-operational.

At 508, the DRA system may determine that the data cluster is operational. In doing so, the DRA system may transmit the data record associated with the network node to the logical server associated with the active repository, as specified within the network node routing list.

At 510, the DRA system may determine that the data cluster is non-operational. In doing so, the DRA system may identify, via the network node routing list, a corresponding standby repository for storage of the data record associated with the network node. Specifically, the standby repository corresponds to an alternate data cluster along with an associated alternate logical server.

At 512, the DRA system may modify an individual routing policy on the network node routing list, for data records associated with the network node that were initially directed towards the non-operational, data cluster. Particularly, the modified routing policy may identify the alternate data cluster along with an associated alternate logical server as the active repository. In this regard, substantially all forthcoming data records sent by the network node would be re-directed to the alternate logical server that associated with the alternate data cluster.

In some examples, the DRA system may modify a routing policy by adjusting the "active repository" designation that is associated with a network node on the network node routing list. In this example, the DRA system may adjust the active repository to identify the alternate data cluster along with the alternate logical server.

At 514, the DRA system may transmit the data record to the alternate logical server associated with the alternate data cluster, based at least in part on the adjusted routing policy on the network node routing list.

FIG. 6 illustrate a block diagram of a Data Redundancy Allocation (DRA) system process that identifies substantially all network nodes that designate a non-operational data cluster (i.e., primary data cluster) as an active repository. In doing so, the DRA system may modify individual routing policies for data records all affected network nodes to selectively re-direct delivery of forthcoming data records from the non-operational data cluster (i.e., primary data cluster), to an alternate data cluster and associated alternate logical server.

At 602, the DRA system may monitor the operational integrity of one or more data clusters associated with a telecommunications network. In some examples, the DRA system may monitor the operational integrity of each data cluster on a continuous basis, per a predetermined schedule, or in response to a triggering event. The triggering event may correspond to receipt of a data record from a network node for storage on a data cluster, or a communication relating to the operational integrity of a data cluster.

At 604, the DRA system may determine that a primary data cluster is non-operational. In one example, the DRA system may determine that the primary data cluster is non-operational based on a failed attempt to establish a communicative connection with the primary data cluster via SFTP.

At 606, the DRA system may identify, via a network node routing list, one or more affected network nodes that designate the primary data cluster as an active repository for storage of data records. The affected network nodes may correspond to a node that facilitates communication traffic over the telecommunication network, such as a Packet Data Network Gateway (PGW), a mobile switching station (MSS), a Serving GPRS Support Node (SGSN), a Gateway GPRS Support Node (GGSN), or any combination thereof.

At 608, the DRA system may identify, via the network node routing list, a corresponding standby repository (i.e., alternate data cluster and corresponding alternate logical server) for each of the affected network nodes. In some examples, the affected network nodes may share a common standby repository since they shared the common, primary data cluster. In other examples, the network node routing list may identify different standby repositories for each of the affected network nodes.

At 610, the DRA system may modify an individual routing policy on the network node routing list, for each of the affected network nodes. More specifically, the DRA system may identify the alternate data cluster along with the alternate logical server as an active repository for each of the affected network nodes. In this regard, rather than data records being directed towards the non-operational, primary data cluster, substantially all forthcoming data records may be re-directed to the alternate logic serer that is associated with the alternate data cluster.

FIG. 7 illustrates a block diagram of a Data Redundancy Allocation (DRA) system process that monitors the operational integrity of one or more logical servers associated with a primary data cluster. In this regard, the DRA system is configured to determine whether a logical server is overloaded, and in doing so, re-allocate data records associated with a number of identified network nodes from the overloaded logical server to an additional logical server that has available storage capacity and/or processing capability. Further, the DRA system is further configured to adjust routing policies on the network node routing list to re-direct forthcoming data records associated with the identified network nodes to the additional logical server in lieu of the overloaded logical server.

At 702, the DRA system may monitor the operational integrity of one or more logical servers associated with a primary data cluster. Particularly, the DRA system may selective monitor data usage associated with the one or more logical servers. The DRA system may monitor the one or more logical servers on a continuous basis, per a predetermined schedule, or in response to a triggering event.

At 704, the DRA system may determine data usage associated with the one or more logical servers. Data usage may correspond to an amount of storage capacity and/or processing capability of a logical server that is used for storage or processing data records. In this regard, the DRA system may identify an overloaded logical server based on a data usage on the overloaded logical server exceeding a predetermined data usage threshold.

At 706, the DRA system may identify one or more additional logical server(s) within the data cluster with available storage capacity and/or processing capability to relieve the overloaded logical server. In one example, the DRA system may select the additional logical server based on its data usage relative to data usage on the overloaded logical server, relative to a predetermined data usage threshold, or a combination of both.

In some examples, the DRA system may select one or more additional logical server(s) that reside within a subset of logical servers associated with the overloaded logical server. For example, a data cluster may be configured such that data records from, a particular type of network node, are delivered to a subset of logical servers. In this regard, in the event that a logical server within the subset of logical servers becomes overloaded, the DRA system may selectively re-allocate data load to other logical servers within the subset of logical servers.

At 708, the DRA system may identify a number of network nodes with associated data records stored on the overloaded logical server whereby data usage consumed by the associated data records account for the portion of data usage above the predetermined data usage threshold. By way of example, the DRA system may determine that the overloaded logical server has exceeded a predetermined data usage threshold by four gigabytes. In doing so, the DRA system may identify individual data records that account for the four gigabytes.

At 710, the DRA system may dynamically re-allocate the data records associated with the identified network nodes to the additional logical server(s). In doing so, the DRA system may have provided the overloaded logical server with sufficient relief to reduce its data usage to the predetermined data usage threshold, or below the predetermined data usage threshold.

At 712, the DRA system may modify individual routing policies on the network node routing list for each of the identified network nodes. In doing so, the DRA system may ensure that forthcoming data records associated with the identified network nodes are transmitted to the additional logical server in lieu of the overloaded logical server. In a non-limiting example, the DRA system may modify a routing policy for an identified network node within the network node routing list, by adjusting the "active repository" designation for the identified network node to designate the additional logical server in lieu of the overloaded logical server.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system comprising:
one or more processors;
memory coupled to the one or more processors, the memory including one or more modules that are executable by the one or more processors to:
receive, from a network node over a telecommunications network, network traffic that includes a data record associated with an operation of a client device on the telecommunications network, the data record including a network node identifier associated with the network node;
identify, via a network node routing list of data records repositories, one of the data records repositories as an active repository of the data records repositories, the active repository having one or more first data clusters each having a corresponding one or more first logical servers inwhich to store the data records, wherein the network node routing list is maintained operationally between the network node and the data records repositories;
identify, via the network node routing list, one or more alternate repositories of the data records repositories, each of the one or more alternate repositories having one or more second data clusters each having one or more second logical servers;
determine an operational integrity of one of the one or more first data clusters; and
designate one of the one or more alternate repositories as a new active repository replaing the oneo f the data records repositories as active repository so as to re-direct the network traffic and change the destination of the data record from the one of the data records repositories to the new active repository;
wherein the one of the one or more first data clusters is a primary data cluster, one of the one or mroe first logical servers is a primary logical server, one of the one or more second data clusters is an alternate data cluster, and one of the one or more second logical servers is an alternate logical server; and
wherein the change of the destination of the data record from the one of the data records repositories to the new active repository stores the data record in the alternate logical server in response to a determination that the primary data cluster is non-operational.

2. The system of claim 1, wherein one or more modules are further executable by the one or processors to:
in response to a determination that the primary data cluster is non-operational;
identify, via the network node routing list, the one of the one or more alternate repositories to become the new active repository for storage of the data record; and
transmit the data record to the alternate logical server of the alternate data cluster of the new active resposity.

3. The system of claim 1, wherein the one or more modules are further executable by the one or more processors to:
establish a communicative connection with the primary data cluster using a secure shell file transfer protocol (SFTP),
wherein, to determine the operational integrity of the primary data cluster is based at least in part on establishing the communicative connection with the primary data cluster.

4. The system of claim 1, wherein the one or more modules are further executable by the one or more processors to:
monitor the operational integrity of the primary data cluster in response to a triggering event, the triggering event corresponding to receipt of a communication relating to the operational integrity of the primary data cluster.

5. The system of claim 1, wherein the one or more modules are further executable by the one or more processors to:
in response to a determination that the primary data cluster is non-operational, identify, via the network node routing list, one or more network nodes that designate the primary data cluster for storage of corresponding data records;
modify individual routing policies associated with the one or more network nodes, the individual routing policies to designate the alternate logical server of the alternate data cluster in the new active repository for storage of data records associated with the one or more network nodes; and
adjust the network node routing list based at least in part on a modification of the individual routing policies associated with the one or more network nodes.

6. The system of claim 1, wherein the one or more modules are further executable by the one or more processors to:
monitor a data usage associated with the primary logical server of the primary data cluster;
determine whether the data usage is less than a predetermined data usage threshold;
dynamically re-allocate individual data records associated with one or more network nodes from the primary logical server to additional logical servers of the one or more first logical servers associated with the primary data cluster, based at least in part on a determination that the data usage of the primary logical server is greater than the predetermined data usage threshold;
modify individual routing policies associated with the one or more network nodes to designate individual ones of the additional logical servers for storage of data records; and
update the network node routing list in response to a modification of the individual routing policies.

7. The system of claim 1, wherein the one or more modules are further executable by the one or more processors to:
identify a number of the first logical servers associated with the primary data cluster that have a data usage that is greater than a predetermined data usage threshold,
wherein to determine the operational integrity of the primary data cluster is based at least in part on the number of the first logical servers.

8. The system of claim 1, wherein the data record corresponds to a charging data record associated with the operation of the client device on the telecommunications network, the charging data records including one or more of a client device identifier, a recipient device identifier, a voice call duration, a time stamp associated with a voice or data communication, or data usage associated with a data communication, and
wherein, the network node facilitates communication traffic over the telecommunication network, the communication traffic including one or more of packet switch traffic, circuit switch traffic, Voice over Long Term Evolution (VoLTE) traffic, Wi-Fi voice traffic, data metering traffic, short messaging service (SMS) traffic, multi-media messaging service (MMS) traffic, and
wherein, the network node corresponds to at least one of a Packet Data Network Gateway (PGW), a mobile switching station (MSS), a Serving GPRS Support Node (SGSN), or a Gateway GPRS Support Node (GGSN).

9. One or more non-transitory computer-readable media storing computer executable instructions that, when executed on one or more processors, cause the one or more processors to perform acts comprising:
receiving, from a network node over a telecommunications network, network traffic that includes a charging data record associated with an operation of a client device on the telecommunications network;
identifying, via a network node routing list of charging data records repositories, one of the charging data records repositories as an active repository of the charging data records repositories, the active repository incluidng one or more first data clusters each having one or more first logical servers in which to store the charging data records, wherein the network node routing list is maintained operationally between the network node and the charging data records repositories;

identifying, via the network node routing list, one or more alternate repositories of the charging data records repositories, each of the one or more alternate respositores having one or mroe second data clusters each having one or more second logical servers;

determining an operational integrity of one of the one or more first data clusters;

monitoring a data usage of one of the one or more first logical servers in response to a determination that the one of the one or more first data clusters is operational; and designating one of the one or more alternate repositories as a new active repository replacing the one of the data records repositories as active repository so as to re-direct the network traffic and change the destination of the charging data record from the one of the data records respositories to the new active respository;

wherein the one of the one or more first data clusters is a primary data cluster, the one of the one or more first logical servers is a primary logical server, one of the one or more second data clusters is an alternate data cluster, and one of the one or more second logical servers is an alternate logical server; and wherein the change of the destination of the charging data record from the one of the data records repositories to the new active repository stores the charging data record in the alternate logical server in response to a determination that the data usage of the primary logical server is greater than a predetermined threshold.

10. The one or more non-transitory computer-readable media of claim 9, further storing instructions that, when executed cause the one or more processors to perform acts comprising:

determining that the primary data cluster is non-operational based at least in part on a failed attempt to establish a communicative connection with the primary data cluster using a secure shell file transfer protocol;

identifying, via the network node routing list, the one of the one or more alternate repositories to become the new active repository for storage of the charging data record; and adjusting an individual routing policy associated with the network node on the network node routing list, the individual routing policy to designate the alternate data cluster and the alternate logical server in the new active repository for storage of charging data records associated with the network node.

11. The one or more non-transitory computer-readable media of claim 9, further storing instructions that, when executed cause the one or more processors to perform acts comprising:

determining that the data usage associated with the primary logical server is greater than the predetermined data usage threshold;

determining that a data usage of an additional logical server associated with the primary data cluster is less than the predetermined data usage threshold;

dynamically re-allocating individual data records associated with one or more network nodes from the primary logical server to the additional logical server;

modifying individual routing policies associated with the one or more network nodes to designate the additional logical server for storage of charging data records; and updating the network node routing list to reflect the individual routing policies.

12. The one or more non-transitory computer-readable media of claim 11, further storing instructions that, when executed cause the one or more processors to perform acts comprising:

identifying a subset of the one or more first logical servers associated with the primary data cluster based at least in part on a network node type associated with the one or more network nodes, wherein the subset of the one or more first logical servers includes the primary logical server and the additional logical server.

13. The one or more non-transitory computer-readable media of claim 11, wherein the data usage of the primary logical server corresponds to a consumption of storage capacity on the primary logical server, and wherein the predetermined data usage threshold corresponds to an upper limit on the consumption of storage capacity on the primary logical server, and further storing instructions that, when executed cause the one or more processors to perform acts comprising:

determining a number of charging data records stored within the primary logical server that cause the data usage on the primary logical server to exceed the predetermined data usage threshold, wherein dynamically re-allocating individual charging data records associated with the one or more network nodes is further based at least in part on a determination of the number of charging data records.

14. The one or more non-transitory computer-readable media of claim 9, further storing instructions that, when executed cause the one or more processors to perform acts comprising:

identifying a number of the first logical servers associated with the primary data cluster that have a data usage greater than the predetermined data usage threshold; and determining that the primary data cluster is non-operational based at least in part on the number of logical servers being greater than a predetermined threshold number of the first logical servers.

15. A computer-implemented method, comprising:
under control of one or more processors:

receiving, from a network node over a telecommunications network, network traffic that includes a data record associated with an operation of a client device on the telecommunications network, the data record including at least a network node identifier;

identifying, via a network node routing list of data records repositories, one of the data records repositories as an active repository of the data records repositories, the active repository corresponding to a primary data cluster and a primary logical server that is associated with the primary data cluster in which to store the data records, wherein the network node routing list is maintained operationally between the network node and the data records repositories;

determining that the primary data cluster is non-operational;

identifying, via the network node routing list, an alternate repository of the data records repositories, the alternate repository corresponding to an alternate data cluster and an alternate logical server that is associated with the alternate data cluster;

designating the alternate repository as a new active repository replacing the one of the data records repositories as active repository so as to re-direct the network traffic and change the destination of the data record from the one of the data records repositories to the new active repository;

adjusting an individual routing policy associated with the network node on the network node routing list, the individual routing policy to designate the alternate data cluster and the alternate logical server in the new active repository for storage of the data record associated with the network node; and transmitting the data record to the alternate logical server associated with the alternate data cluster, based at least in part on the adjusting of the individual routing policy associated with the network node on the network node routing list.

16. The computer-implemented method of claim 15, further comprising:

initiating a communicative connection with the primary data cluster via secure shell file transfer protocol, wherein determining that the primary data cluster is non-operational is based at least in part on a failed attempt to establish the communicative connection.

17. The computer-implemented method of claim 15, further comprising:

monitoring the operational integrity of the primary data cluster in response to a triggering event, the triggering event corresponding to receipt of a communication relating to an operational integrity of the primary data cluster.

18. The computer-implemented method of claim 15, further comprising:

identifying, via the network node routing list, additional network nodes that designate the primary logical server associated with the primary data cluster as the active repository for storage of corresponding data records;

modifying individual routing policies associated with the additional network nodes to designate the alternate logical server associated with the alternate data cluster as the active repository for storage of data records; and adjusting the network node routing list based at least in part on a modification of the individual routing policies associated with the additional network nodes.

19. The computer-implemented method of claim 15, further comprising:

receiving an indication that the primary data cluster is operational; and adjusting the individual routing policy associated with the network node on the network node routing list to designate the primary logical server associated with the primary data cluster as the active repository for storage of the data record associated with the network node.

20. The computer-implemented method of claim 15, further comprising:

monitoring a data usage associated with one or more primary logical servers associated with the primary data cluster; and determining a number of primary logical servers with data usage that is greater than a predetermined data usage threshold, based at least in part on monitored data usage, wherein determining that the primary data cluster is non-operational is based at least in part on the number of primary logical servers greater than a predetermined threshold number of logical servers.

* * * * *